(12) United States Patent
Camp et al.

(10) Patent No.: US 10,914,457 B1
(45) Date of Patent: Feb. 9, 2021

(54) BRACKET FOR MOUNTING A COVER IN A LIGHTING UNIT

(71) Applicant: The Boeing Company, Chicago, IL (US)

(72) Inventors: Randolph C. Camp, Kirkland, WA (US); Mira N. Hoang, Bothell, WA (US); Chris K. Flanagan-Linderman, Federal Way, WA (US)

(73) Assignee: THE BOEING COMPANY, Chicago, IL (US)

(*) Notice: Subject to any disclaimer, the term of this patent is extended or adjusted under 35 U.S.C. 154(b) by 0 days.

(21) Appl. No.: 16/776,607

(22) Filed: Jan. 30, 2020

(51) Int. Cl.
| | |
|---|---|
| *F21V 17/10* | (2006.01) |
| *F21V 17/16* | (2006.01) |
| *B64D 11/00* | (2006.01) |
| *F21W 107/30* | (2018.01) |
| *F21W 106/00* | (2018.01) |

(52) U.S. Cl.
CPC ............ *F21V 17/107* (2013.01); *B64D 11/00* (2013.01); *F21V 17/164* (2013.01); *B64D 2011/0038* (2013.01); *F21W 2106/00* (2018.01); *F21W 2107/30* (2018.01)

(58) Field of Classification Search
CPC ...... F21V 17/107; F21V 17/164; B64D 11/00
USPC ........................................................ 362/581
See application file for complete search history.

(56) References Cited

U.S. PATENT DOCUMENTS

| | | | | |
|---|---|---|---|---|
| 3,944,809 A * | 3/1976 | Moore | .................... | F21S 8/086 362/328 |
| 4,208,702 A * | 6/1980 | Wotowiec | ............... | F21V 17/02 248/205.1 |
| 4,510,559 A * | 4/1985 | Kristofek | .............. | F21V 17/104 362/148 |
| 4,554,621 A * | 11/1985 | Corrigan | ............. | F21V 19/0005 362/199 |
| 4,642,742 A * | 2/1987 | de Vos | ..................... | F21V 17/02 362/269 |
| 5,440,466 A * | 8/1995 | Belisle | .................. | F21V 17/107 362/222 |
| 6,082,878 A * | 7/2000 | Doubek | .................. | F21S 8/026 211/26 |
| 7,434,967 B2 * | 10/2008 | Dupre | ..................... | F21S 8/026 362/366 |
| 8,763,954 B2 * | 7/2014 | Rajasingham | ........... | B60N 2/34 244/118.6 |
| 2013/0215623 A1 * | 8/2013 | Goodman | ............... | F21V 21/00 362/341 |
| 2018/0332965 A1 * | 11/2018 | Rocamora | ............... | F16B 12/10 |
| 2019/0344896 A1 * | 11/2019 | Wilcynski | .............. | B64D 11/00 |

\* cited by examiner

*Primary Examiner* — Bryon T Gyllstrom
(74) *Attorney, Agent, or Firm* — Coats & Bennett, PLLC

(57) ABSTRACT

A bracket for mounting a cover to a lighting unit. The bracket includes a mounting portion and a supporting portion that are pivotally connected together. The mounting portion includes a support surface to contact against and support the cover. The supporting portion is movable relative to the mounting portion between an open position away from the mounting portion and a closed position in proximity to the mounting portion to support the cover over the lighting unit. A lock includes a first arm on the mounting portion and a second arm on the supporting portion. The first and second arms are positioned to engage together to secure the supporting portion in the closed position.

20 Claims, 9 Drawing Sheets

BRACKET FOR MOUNTING A COVER IN A LIGHTING UNIT

TECHNOLOGICAL FIELD

The present disclosure relates generally to a bracket and, more specifically, a bracket that is movable between open and closed positions to support a cover over a lighting element in a lighting unit.

BACKGROUND

A lighting unit generally includes a frame and one or more lighting elements such as but not limited to a bulb or LED array. A cover can extend over the lighting elements. The cover can be a lens that concentrates or disperses the emitted light. The cover can also function to protect the lighting elements, such as to prevent tampering with the lighting elements or to prevent inadvertent contact with the lighting elements.

Lighting units can be installed in a wide variety of locations and for use in a wide number of different contexts. One application is to provide light along the length of the cabin area of a commercial aircraft. Specifically, the lighting units are installed along the outer walls of the cabin area and underneath the storage compartments that extend along the cabin area. The lighting units provide light to the passengers to identify their seats and different locations within the cabin area, and also provide for a pleasing aesthetic appearance in the cabin area. Covers extend over the lighting units to prevent passengers from tampering with the lighting elements and can also affect the aesthetic appearance.

The placement of the lighting units can make installation difficult. For example, using the commercial aircraft example, the lighting units are mounted at the junction of the outer walls and the overhead compartments. This location can make it difficult for a technician to position the lighting units. Once positioned, the location makes it difficult for the technician to install the covers over the lighting elements. The technician can be required to position and hold the covers and simultaneously manipulate a tool secure the covers in place. To compound the issue, the cabin area includes numerous lighting units mounted along the outer walls on each side of the cabin area. The technician is required to perform these maneuvers repeatedly to install all the lighting units along the cabin area.

SUMMARY

One aspect is directed to a bracket for mounting a cover to a lighting unit. The bracket comprises a mounting portion and a supporting portion pivotally connected to the mounting portion. The supporting portion comprises a support surface to contact against and support the cover. The supporting portion is movable relative to the mounting portion between an open position away from the mounting portion and a closed position in proximity to the mounting portion to support the cover over the lighting unit. A lock comprises a first arm on the mounting portion and a second arm on the supporting portion. The first and second arms are positioned to engage together to secure the supporting portion in the closed position.

In another aspect, each of the mounting portion and the supporting portion comprises an elongated body with a first end and a second end with the first ends pivotally connected together and the second ends spaced apart by a first distance in the open position and a smaller second distance in the closed position.

In another aspect, the support surface of the supporting portion faces the mounting portion in the closed position.

In another aspect, the first and second arms of the lock are spaced apart in the open position and in contact and engaged together in the closed position.

In another aspect, the second arm of the lock extends outward from the support surface.

In another aspect, the lock comprises a lock face on one of the first and second arms and one of the mounting portion and the supporting portion comprises an opening in proximity to the lock face when the mounting portion and the supporting portion are in the closed position.

In another aspect, the bracket has an annular shape in the closed position.

In another aspect, the mounting portion and the supporting portion comprise a single piece connected together at a living hinge.

In another aspect, each of the first and second arms comprise ratcheting teeth with first surfaces oriented at a first angle relative to the respective arms for sliding movement when moving towards the closed position and with second surfaces oriented at a different second angle relative to the respective arms that prevents movement towards the open position.

One aspect is directed to a bracket for mounting a cover to a lighting unit. The bracket comprises a mounting portion and a supporting portion each comprising a body with a first end and a second end, and with the supporting portion further comprising a support surface. A socket is positioned at one of the first ends and a mating cylinder is positioned at the other of the first ends with the socket having a curved shape that extends partially around the cylinder to pivotally connect the mounting portion and the supporting portion to be movable between an open position and a closed position. A lock comprising a first arm extends outward from the body of the mounting portion and a second arm that extends outward from the body of the supporting portion. The open position comprises the second ends of the mounting portion and the supporting portion spaced apart by a first distance and the first and second arms of the lock apart. The closed position comprises the second ends of the mounting portion and the supporting portion spaced apart by a smaller second distance with the first and second arms of the lock in contact to prevent movement towards the open position, and the support surface facing inward towards the body of the mounting portion.

In another aspect, the second arm of the lock extends outward from the support surface of the supporting portion.

In another aspect, the support surface is flat.

In another aspect, each of the first and second arms comprise ratcheting teeth with first surfaces oriented at a first angle relative to the respective arms to provide for sliding movement when moving towards the closed position and with second surfaces oriented at a different second angle relative to the respective arms that prevent movement towards the open position.

In another aspect, the mounting portion has a length measured between the first and second ends and a width measured perpendicular to the length with the length greater than the width.

In another aspect, the socket comprises first and second ends that are spaced apart by a distance with a diameter of the cylinder greater than the distance to prevent the cylinder from escaping from the socket.

In another aspect, an opening extends through the supporting portion with the first arm of the lock comprising a lock face that faces towards the opening.

One aspect is directed to a method of retaining a cover on a lighting unit in a vehicle. The method comprises: positioning a supporting portion of a bracket in an open position while a mounting portion of the bracket is secured to the vehicle with the supporting portion and the mounting portion being pivotally connected at a pivot; pivoting the supporting portion relative to the mounting portion about the pivot in a first direction and moving a second end of the supporting portion towards the mounting portion; contacting a support surface of the supporting portion against the cover and supporting the cover over the lighting unit; and locking the supporting portion while supporting the cover and preventing the supporting portion from pivoting in a second direction.

In another aspect, the method further comprises engaging ratcheting teeth on the mounting portion and the supporting portion and locking the supporting portion to the mounting portion.

In another aspect, the method further comprises laterally inserting a cylinder on one of the mounting portion and the supporting portion into a socket in the other of the mounting portion and the supporting portion and attaching the supporting portion to the mounting portion.

In another aspect, the method further comprises maintaining the supporting portion and the mounting portion together in both the open position and a closed position.

The features, functions and advantages that have been discussed can be achieved independently in various aspects or may be combined in yet other aspects, further details of which can be seen with reference to the following description and the drawings.

DETAILED DESCRIPTION

Figure 1:
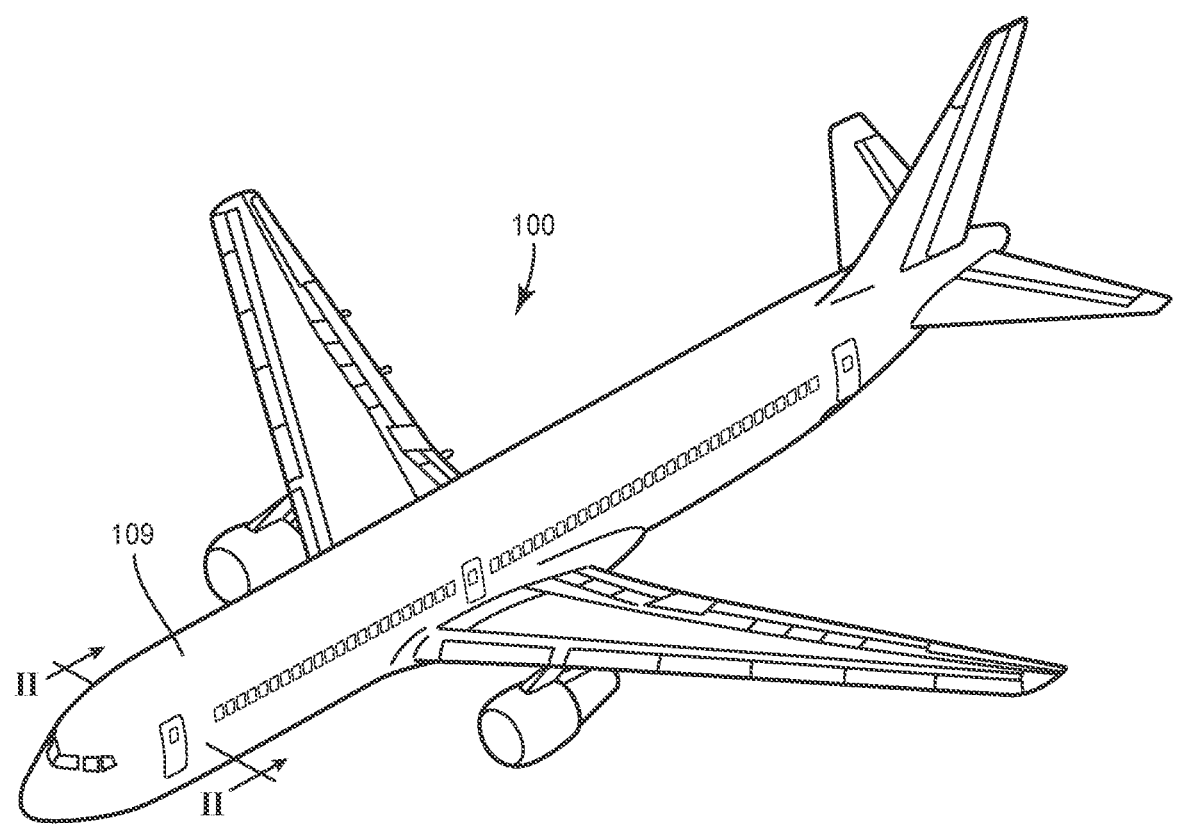
FIG. 1 a perspective view of a vehicle.
Figure 2:
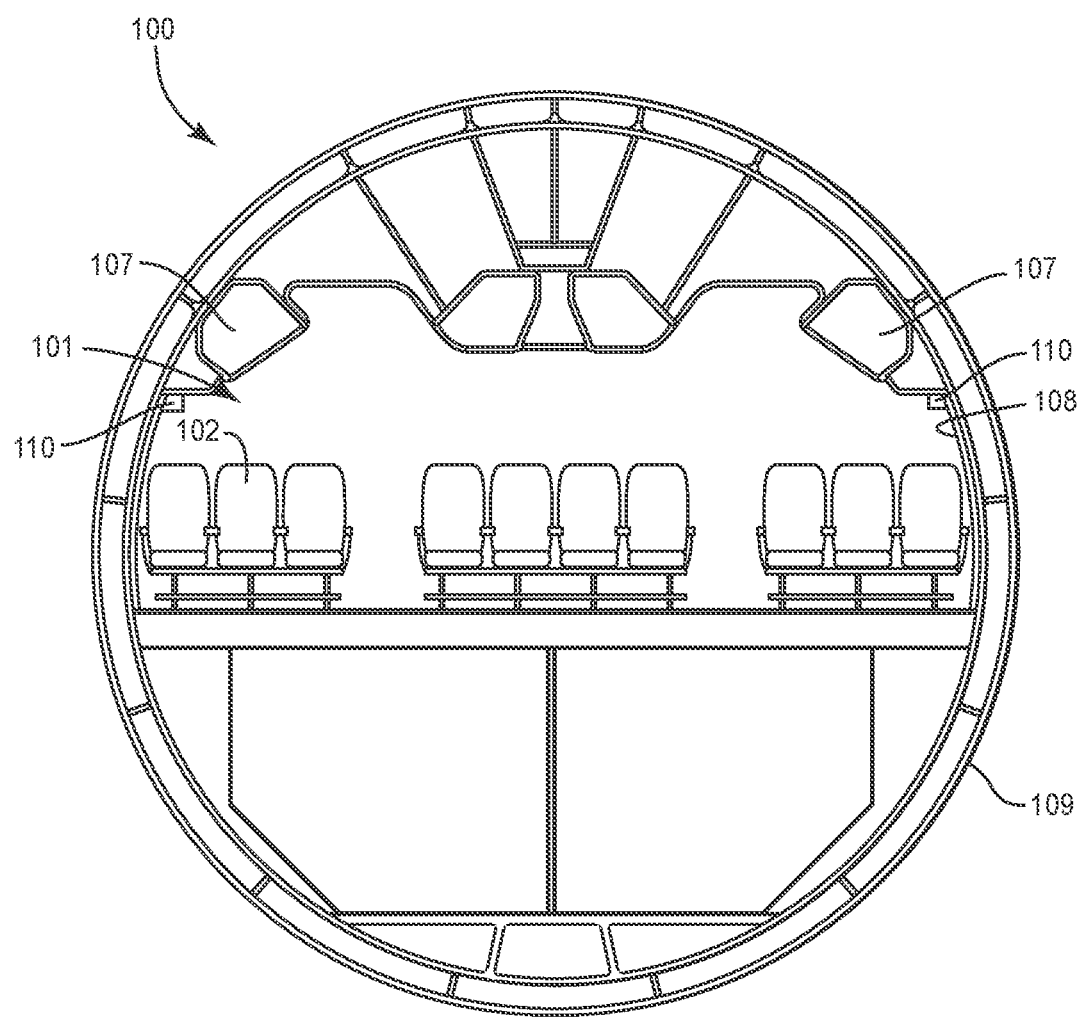
FIG. 2 is section view cut along line II-II of FIG. 1 that illustrates an interior space of the vehicle that includes lighting units.

The present application is directed to a bracket 10 for positioning and mounting a cover 111 over a lighting element 114 of a lighting unit 110. The bracket 10 can be used in a variety of contexts, including within a lighting unit 110 on a vehicle 100. One type of vehicle 100 is an aircraft as illustrated in FIGS. 1 and 2. A cabin area 101 is formed within the interior of the fuselage 109. The cabin area 101 is formed within an inner wall 108 that is operatively connected to the outer shell of the fuselage 109. Seats 102 extend across the width and length of the cabin area 101. Storage compartments 107 provide for passengers to storage luggage and other personal items above the seats 102. Lighting units 110 are attached to the underneath of the storage compartments 107 and/or the wall 108. The lighting units 110 are positioned in a corner formed by the storage compartments 107 and wall 108. The lighting units 110 can extend along the entirety of the cabin area 101, or can extend along one or more limited sections.

Figure 3:
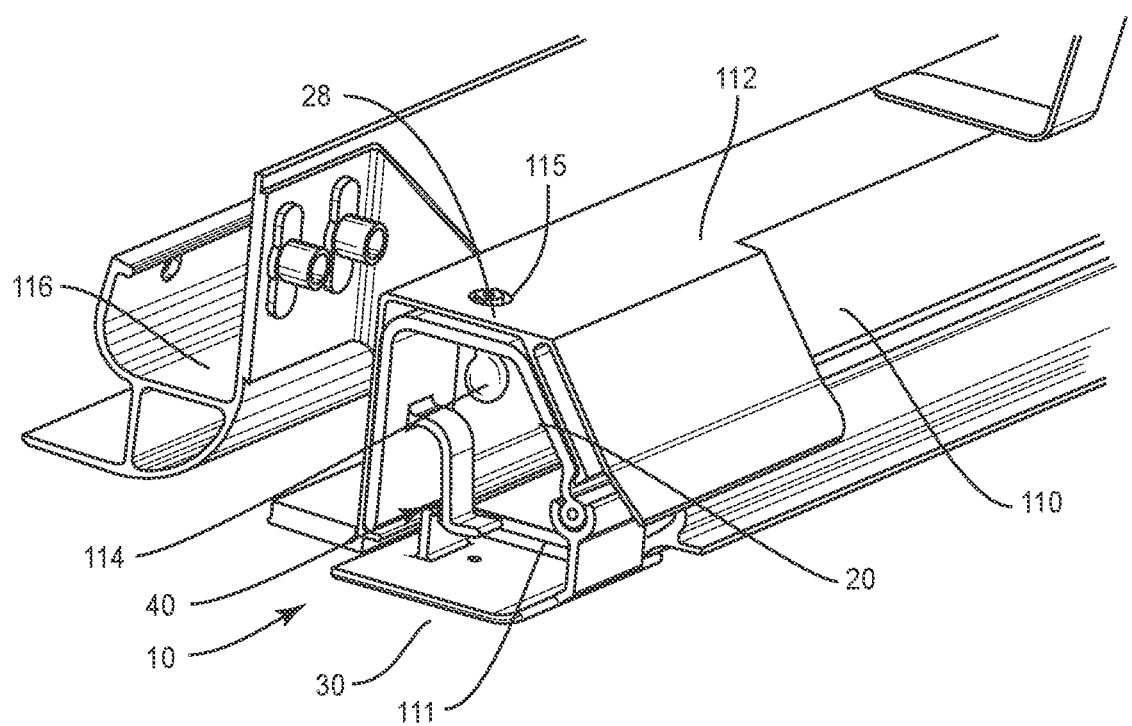
FIG. 3 is a perspective view of a bracket mounted to a rail of a lighting unit and in a closed position supporting a cover over a lighting element.
Figure 4:
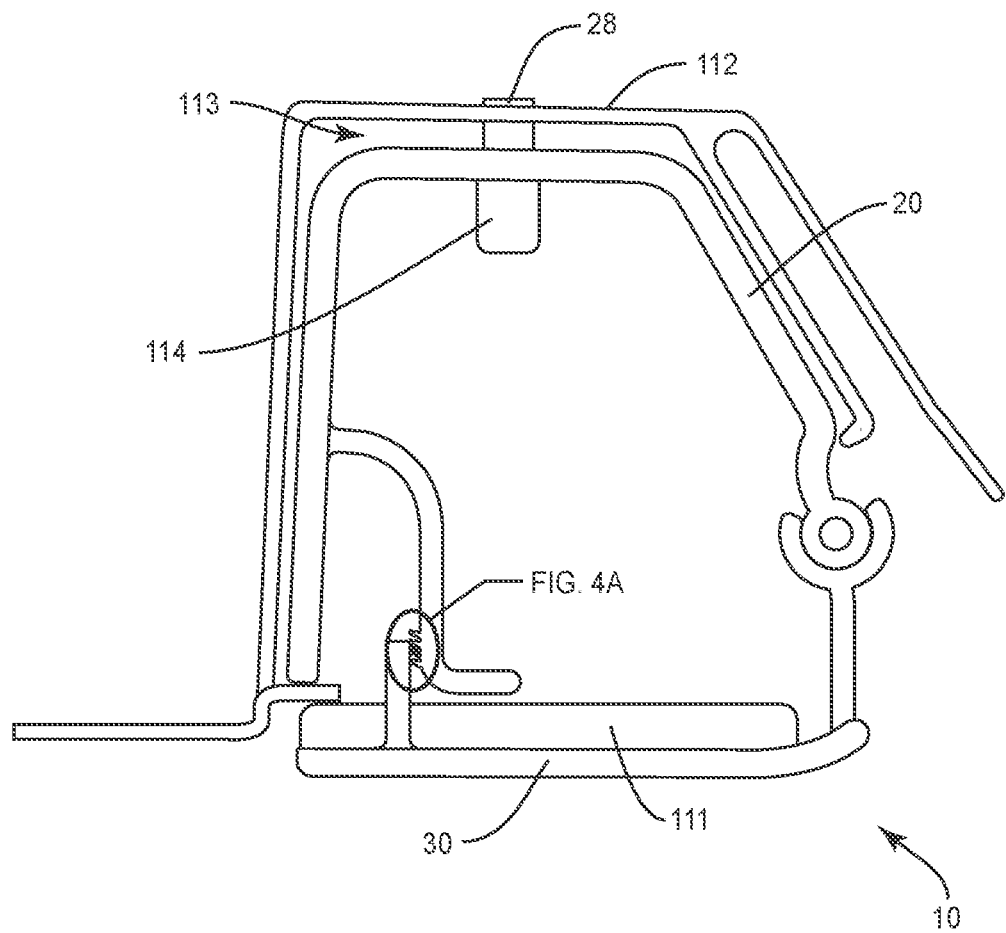
FIG. 4 is an end view of a bracket in a closed position supporting a cover over a lighting element.

As illustrated in FIGS. 3 and 4, the lighting units 110 include a rail 112 sized and shaped to be attached to the storage compartments 107 and/or wall 108. The rail 112 forms a channel 113 that houses one or more lighting elements 114. The lighting unit 110 can include various types of lighting elements 114, including but not limited to LED arrays and electric bulbs. In one example as illustrated in FIG. 3, the lighting unit 110 is incorporated with an air conditioning vent 116. The rail 112 of the lighting unit 110 and the vent 116 of the air conditioning unit can be a single extruded part, or can be multiple parts that are connected together with mechanical fasteners.

The lighting unit 110 includes a translucent cover 111 that is positioned over one or more of the lighting elements 114. The cover 111 prevents tampering of the lighting element 114 by a passenger. The cover 111 can also affect the visual appearance of the light to direct and/or adjust the light output. In one example, the cover 111 is a lens that focuses or disperses the light that is emitted from the lighting element 114.

As illustrated in FIGS. 3 and 4, a bracket 10 is mounted in the rail 112 to position and support the cover 111 over the lighting element 114. The bracket 10 is adjustable between a closed position as illustrated in FIGS. 3 and 4 to support and position the bracket 10. The cover 111 can be positioned in an open position. The open position provides for initially installing the lighting unit 110. The open position also provides for removing the cover 111 such as during maintenance to replace a lighting element 114.

Figure 5:
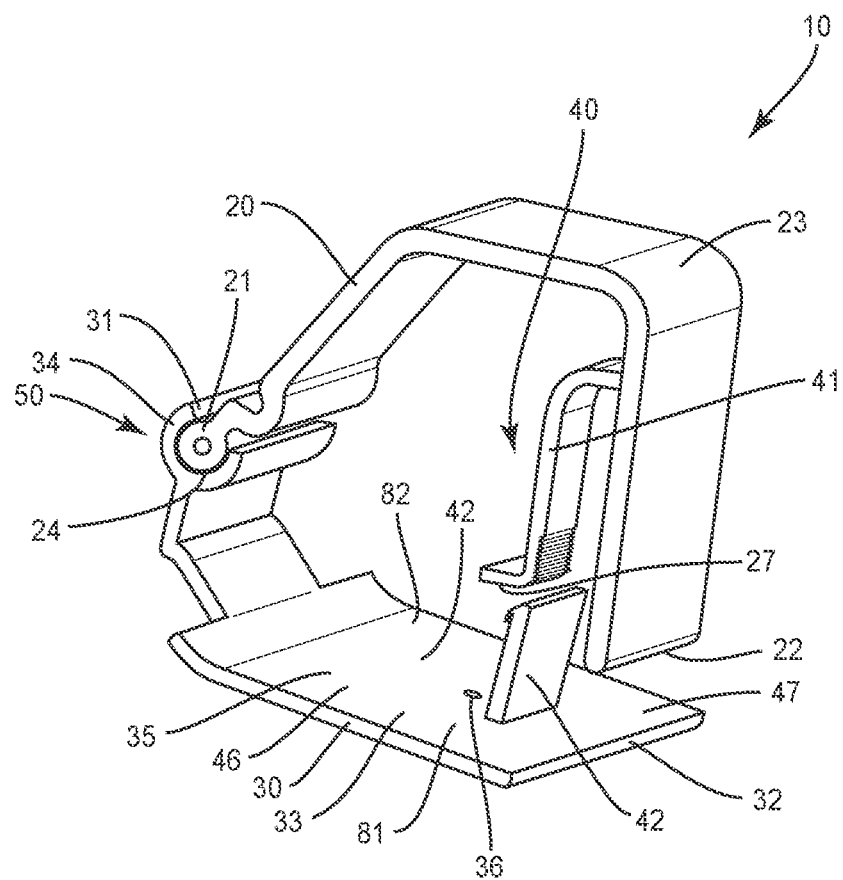
FIG. 5 is a perspective view of a bracket.

FIG. 5 illustrates the bracket 10 that includes a mounting portion 20 and a supporting portion 30. The mounting portion 20 is sized to fit within the channel 113 that is formed in the rail 112. The supporting portion 30 is configured to contact and support the cover 111. The mounting portion 20 and the supporting portion 30 are pivotally connected together and movable between the open and closed positions. In the open position, the supporting portion 30 is pivoted outward from the mounting portion 20. This provides for inserting the cover 111 over the lighting element 114 and/or removing the cover 111. In the closed position, the supporting portion 30 is pivoted inward towards the mounting portion 20 to contact against and position the cover 111 over the lighting element 114. The bracket 10 further includes a lock 40 to secure the bracket 10 in the closed position.

The mounting portion 20 has a concave shape that is sized to fit within the channel 113. The mounting portion 20 can be mounted to rail 112 in various manners. In one example, one or more fasteners (not illustrated) extend through the body 23 and into the rail 112. In another example, the body 23 includes a clip that attaches to the rail 112. In another example, the body 23 is flexible and is deformed to fit into the channel 113 and exerts an outward force on the channel 113 to maintain the position. The body 23 includes a tab 28 that extends outward from a top of the body 23. The tab 28 is sized to fit within an opening 115 in the rail 112 to locate the bracket 10 along the rail 112 as illustrated in FIG. 3.

Figure 6:
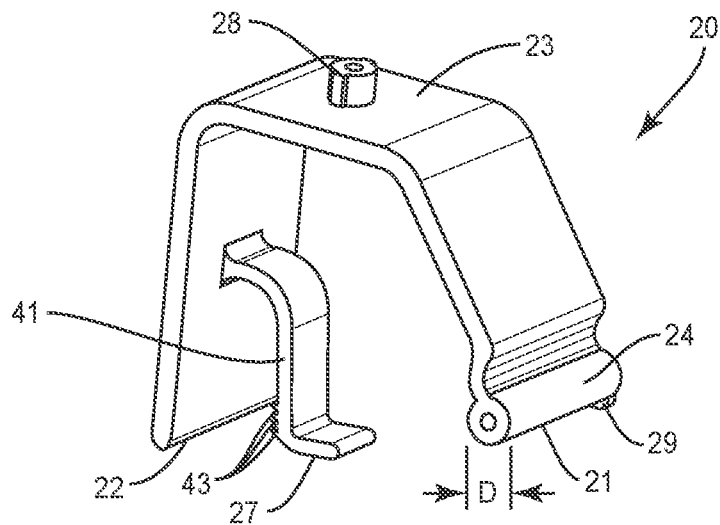
FIG. 6 is a perspective view of a mounting portion.

As illustrated in FIGS. 5 and 6, the mounting portion 20 includes an elongated body 23 with a first end 21 and a second end 22. The mounting portion 20 forms a substantially C-shape with a closed section that fits into the channel 113, and an open side that receives the supporting portion 30. The body 23 has a length measured between the first and second ends 21, 22 and a width that is perpendicular to the length. The body 23 is relatively narrow with the length larger than the width.

A cylinder 24 is positioned at the first end 21 of the body 23. The cylinder 24 has a diameter D and a width that is substantially equal to the width of the body 23. As illustrated in FIG. 6, a tab 29 extends radially outward from an end of the cylinder 24. The tab 29 positions the cylinder 24 when mounted to the supporting portion 30 as will be explained below.

A first arm 41 of the lock 40 extends from an inner side of the body 23 and is spaced away from the cylinder 24. Teeth 43 are positioned along a section of the first arm 41. The outer end of the first arm 41 forms a flange with a lock face 27 that faces away from the body 23. The lock face 27 provides a contact surface for unlocking the lock 40 as will be explained in more detail below.

Figure 7:
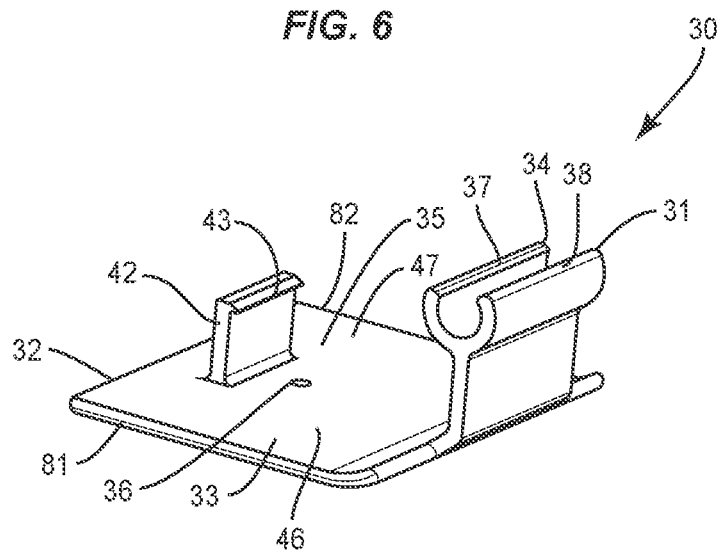
FIG. 7 is a perspective view of a supporting portion.

The supporting portion 30 contacts against and supports the cover 111. As illustrated in FIGS. 5 and 7, the supporting portion 30 includes a body 33 with a first end 31 and a second end 32. The first end 31 is configured to engage with the mounting portion 20 and includes a socket 34 that receives the cylinder 24. The socket 34 includes a curved surface that extends between ends 37, 38. The socket 34 and cylinder 24 include smooth surfaces that provide for the cylinder 24 to rotate within the socket 34 when the bracket 10 moves between the open and closed positions.

Figure 8:
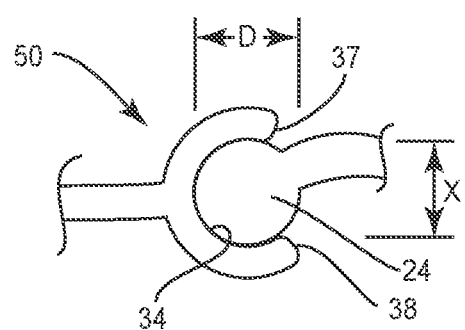
FIG. 8 is an end view of a pivot that includes a cylinder positioned within a socket.

The shape of the socket 34 corresponds to the cylinder 24 for the socket 34 to contain the cylinder 24. The socket 34 can extend around more than one-half of the circumference of the cylinder 24 (i.e., more than 180 degrees around the cylinder 24). As illustrated in FIG. 8, the distance X between the ends 37, 38 of the socket 34 is less than the diameter D of the cylinder 24. This sizing prevents the cylinder 24 from being removed from the socket 34 through the opening formed between the ends 37, 38.

The socket 34 and cylinder 24 mate together by laterally inserting and sliding the cylinder 24 into the socket 34. The extent of insertion is limited by the tab 29 (see FIG. 6) that extends outward from the cylinder 24. The tab 29 contacts against the lateral side of the socket 34 when the cylinder 24 is fully inserted. In another example, tab 29 extends outward from an end of the socket 34 and contacts against an end of the cylinder 24 when fully inserted.

The bracket 10 can also include different pivot 50 constructions. In another example, the mounting portion 20 includes a socket and the supporting portion 30 includes a cylinder. The cylinder of the supporting portion mounts to the socket of the mounting portion 20 for the mounting portion 20 and the supporting portion 30 to be pivotally connected.

The supporting portion 30 also includes a support surface 35. The support surface 35 contacts against and supports the cover 111 when the bracket 10 is in the closed position. The support surface 35 and the outer side of the cover 111 can each be flat to facilitate contact with the portion of the cover 111 that overlaps onto the support surface 35.

The second arm 42 of the lock 40 extends outward from the supporting portion 30. In one example as illustrated in FIGS. 5 and 7, the second arm 42 extends outward from the support surface 35. Another example include the second arm 42 extending outward from a portion away from the support surface 35 and in closer proximity to the first end 31. The second arm 42 includes one or more teeth 43 that are configured to engage with the one or more teeth 43 on the first arm 41.

Figure 4A:
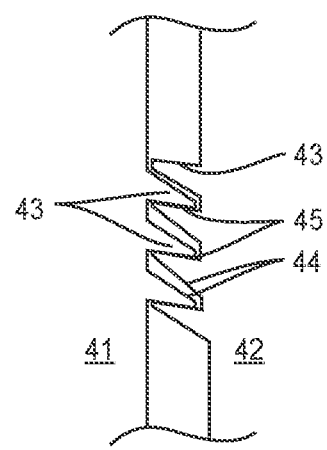
FIG. 4A is a close-up view from FIG. 4 illustrating teeth of a lock that are engaged together.

As illustrated in FIG. 4A, the teeth 43 are configured to slide past each other when the bracket 10 moves towards the closed position, and to engage together and prevent separation when the bracket 10 moves towards the open position. Each of the teeth 43 include a first surface 44 positioned at a first angle relative to their respective first and second arms 41, 42, and a second surface 45 positioned at a different second angle. The first angles provide for sliding contact in the first direction. The second angles provide for the teeth 43 to engage together and prevent sliding past one another in the second direction. In one example, the second surfaces 45 are perpendicular to centerlines of the respective first and second arms 41, 42. The first and second arms 41, 42 can each include one or more teeth 43. In one specific example as illustrated in FIG. 4A, each of the first and second arms 41, 42 includes multiple teeth 43. As illustrated in FIG. 4, the bracket 10 has an annular shape in the closed position.

As illustrated in FIGS. 5 and 7, an opening 36 extends through the supporting portion 30. The opening 36 is positioned in proximity to the second arm 42. The opening 36 provides for inserting a tool to contact against the lock face 27 of the first arm 41. The tool can apply a force to the first arm 41 to move the teeth 43 of the first arm 41 out of engagement with the teeth 43 of the second arm 42. Once disengaged, the bracket 10 can be moved to the open position. In another example, the opening 36 extends through the mounting portion 20 and is positioned to contact against the second arm 42 to disengage the lock 40.

Figure 9:
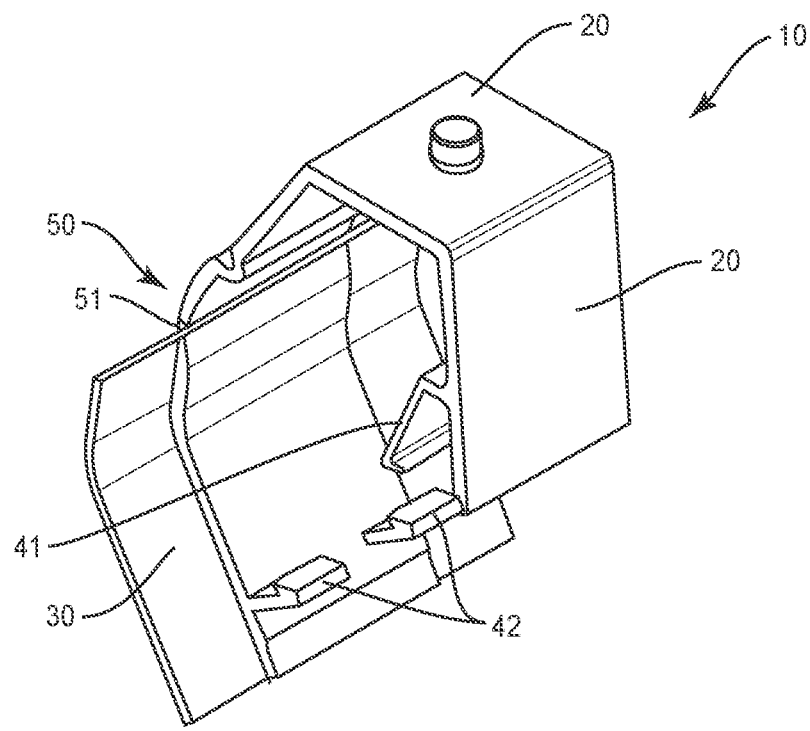
FIG. 9 is a perspective view of a bracket in an open position.

The mounting portion 20 and the supporting portion 30 can include various shapes and configurations. FIG. 9 includes a bracket 10 with the mounting portion 20 and supporting portion 30 as a single piece connected together at a living hinge 51. The living hinge 51 is a thin flexible section that connects the thicker and more rigid mounting portion 20 and supporting portion 30. The living hinge 51 is thinner and/or cut to allow for the bracket 10 to bend along the length.

Figure 10:
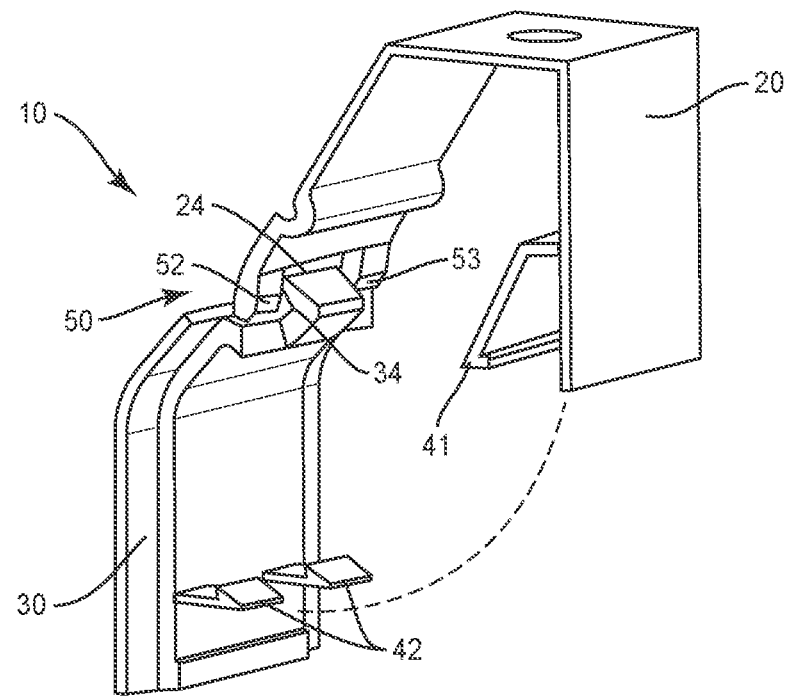
FIG. 10 is a perspective view of a bracket in an open position.

FIG. 10 includes a bracket 10 with the mounting portion 20 having a central cylinder 24 that extends between opposing arms 52, 53. The supporting portion 30 includes a socket 34 that receives the cylinder 24. The relative sizes of the socket 34 and cylinder 24 can provide for the socket 34 to snap onto the cylinder 24 without lateral movement.

FIGS. 9 and 10 include the lock 40 having two arms 42 that extend outward from the supporting portion 30 and a single arm 41 on the mounting portion 20. The single arm 41 can be wider to engage concurrently with each of the two arms 42.

Figure 11:
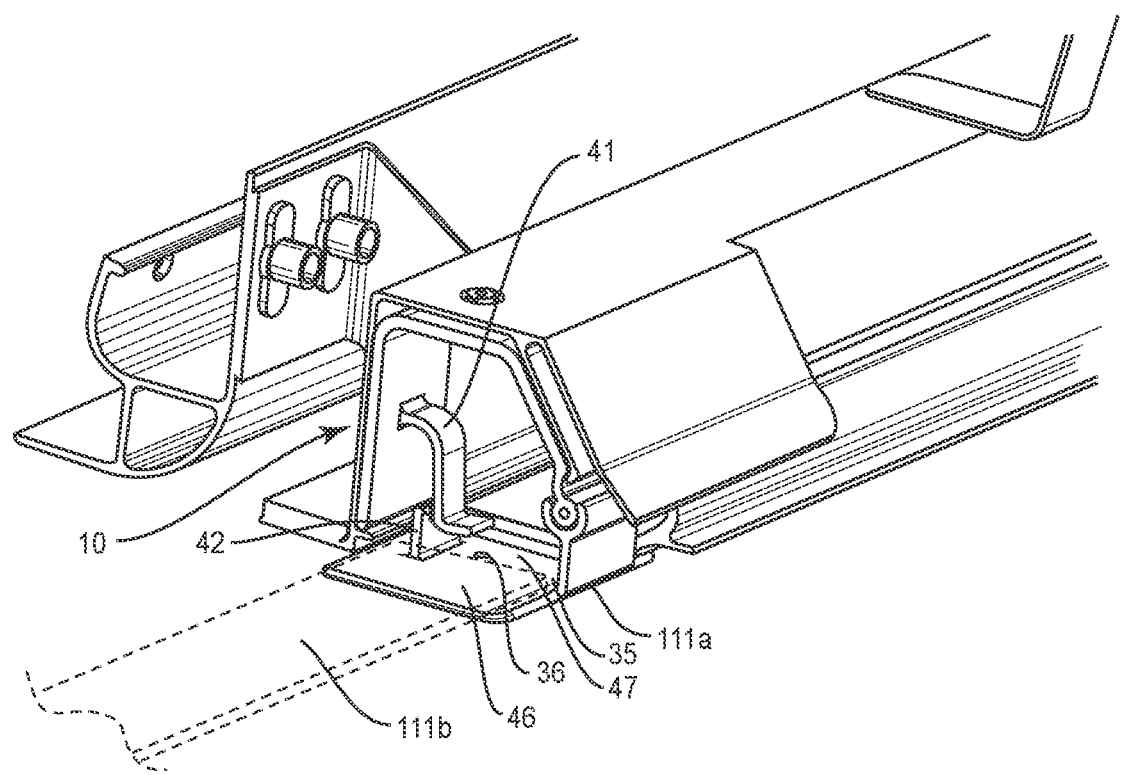
FIG. 11 is a perspective view of a lighting unit that includes a bracket in a closed position and supporting a pair of covers and with a section of the rail removed for clarity.

The bracket 10 can support a single cover 111 as illustrated in FIG. 3. The bracket 10 can also support a pair of covers 111. As illustrated in FIGS. 5 and 7, the support surface 35 includes lateral sides 81, 82. A first section 46 of the support surface 35 that extends between lateral side 81 and the second arm 42 of the lock 40 is configured to support a first cover 111a. A second section 47 between the lateral side 82 and the second arm 42 is configured to support a second cover 111b. The support of a pair of cover 111a, 111b is illustrated in FIG. 11. The first cover 111a is supported by the first section 46 of the support surface 35 and the second cover 111b is supported by the second section 47.

Figure 12:
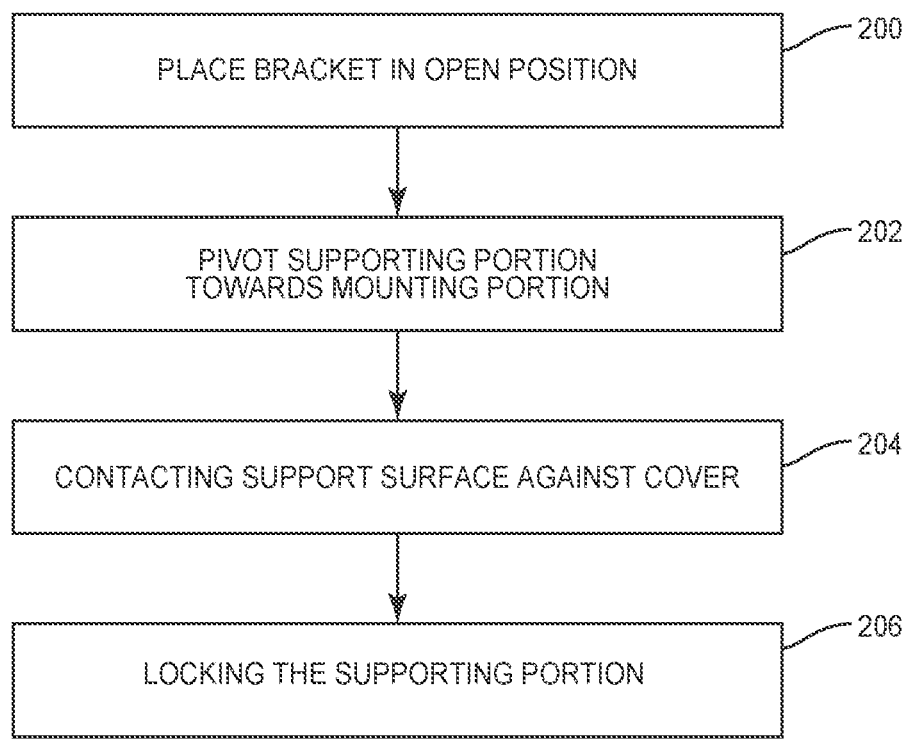
FIG. 12 is a flowchart diagram of a method of retaining a cover on a lighting unit.

FIG. 12 illustrates a method of retaining a cover 111 on a lighting unit 110. After the bracket 10 is mounted, the bracket 10 is placed in an open position (block 200). This can include the supporting portion 30 of a bracket 10 being pivoted in the open position while the mounting portion 20 of the bracket 10 is secured. Once the cover 111 is positioned over the one or more lighting elements 114, the supporting portion 30 is pivoted relative to the mounting portion 20 about the pivot 50 in a first direction (block 202). This pivoting motion moves the second end 32 of the supporting portion 30 towards the mounting portion 20. The support surface 35 of the supporting portion 30 contacts against the cover 111 that is positioned over the lighting element 114 to supporting the cover 111 over the lighting element (block 204). The supporting portion 30 is locked while supporting the cover 111 (block 206). The movement of the supporting portion 30 towards the mounting portion 20 causes the first and second arms 41, 42 to move past each other. The teeth 43 of the first and second arms 41, 42 engage during the movement to lock the bracket 10. The extent of pivoting can be controlled to position the one or more covers 111 as needed. The locking prevents the supporting portion 30 from pivoting in a second direction away from the mounting portion 20.

The method can be used to position and support a single cover 111, or a pair of covers 111. When supporting a single cover 111, the cover 111 contacts against and supported by one of the first and second sections 46, 47. When supporting a pair of covers 111, the first cover 111 is supported by the first section 46, and the second cover 111 is supported by the second section 47.

Once the bracket 10 is in a locked position, opening the bracket 10 requires insertion of a tool into the opening 36. The tool 36 has an elongated shape and is sized to fit through the opening 36. An end of the tool contacts against the lock face 27 on the first arm 41. A force is applied to the tool to move the first arm 41 away from the second arm 42. This movement disengages the teeth 43. Once disengaged, the supporting portion 30 can be pivoted away from the mounting portion 20 to release the one or more covers 111 that are being supported.

The bracket 10 can be constructed from a variety of materials, including but not limited to plastics and metals. In one example, the bracket 10 is injection molded plastic.

The bracket 10 can be used on a variety of vehicles 100. Vehicles 100 include but are not limited to manned aircraft, unmanned aircraft, manned spacecraft, unmanned spacecraft, manned rotorcraft, unmanned rotorcraft, satellites, rockets, missiles, manned terrestrial vehicles, unmanned terrestrial vehicles, manned surface water borne vehicles, unmanned surface water borne vehicles, manned sub-surface water borne vehicles, unmanned sub-surface water borne vehicles, and combinations thereof.

The present invention can be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A bracket for mounting a cover to a lighting unit, the bracket comprising:

a mounting portion;

a supporting portion pivotally connected to the mounting portion and comprising a support surface to contact against and support the cover, the supporting portion movable relative to the mounting portion between an open position away from the mounting portion and a closed position in proximity to the mounting portion to support the cover over the lighting unit; and a lock comprising a first arm on the mounting portion and a second arm on the supporting portion, the first and second arms are positioned to engage together to secure the supporting portion in the closed position.

2. The bracket of claim 1, wherein each of the mounting portion and the supporting portion comprises an elongated body with a first end and a second end, the first ends pivotally connected together and the second ends spaced apart by a first distance in the open position and a smaller second distance in the closed position.

3. The bracket of claim 2, wherein support surface of the supporting portion faces the mounting portion in the closed position.

4. The bracket of claim 3, wherein the first and second arms of the lock are spaced apart in the open position and in contact and engaged together in the closed position.

5. The bracket of claim 1, wherein the second arm of the lock extends outward from the support surface.

6. The bracket of claim 1, wherein the lock comprises a lock face on one of the first and second arms and one of the mounting portion and the supporting portion comprises an opening in proximity to the lock face when the mounting portion and the supporting portion are in the closed position.

7. The bracket of claim 1, wherein the bracket has an annular shape in the closed position.

8. The bracket of claim 1, wherein the mounting portion and the supporting portion comprise a single piece connected together at a living hinge.

9. The bracket of claim 1, wherein each of the first and second arms comprise ratcheting teeth with first surfaces oriented at a first angle relative to the respective arms for sliding movement when moving towards the closed position and with second surfaces oriented at a different second angle relative to the respective arms that prevent movement towards the open position.

10. A bracket for mounting a cover to a lighting unit, the bracket comprising:

a mounting portion and a supporting portion each comprising a body with a first end and a second end, the supporting portion further comprising a support surface;

a socket positioned at one of the first ends and a mating cylinder positioned at the other of the first ends, the socket having a curved shape that extends partially around the cylinder to pivotally connect the mounting portion and the supporting portion to be movable between an open position and a closed position;

a lock comprising a first arm that extends outward from the body of the mounting portion and a second arm that extends outward from the body of the supporting portion;

the open position comprising the second ends of the mounting portion and the supporting portion spaced apart by a first distance and the first and second arms of the lock being apart; and the closed position comprising the second ends of the mounting portion and the supporting portion spaced apart by a smaller second distance, the first and second arms of the lock in contact to prevent movement towards the open position, and the support surface facing inward towards the body of the mounting portion.

11. The bracket of claim 10, wherein the second arm of the lock extends outward from the support surface of the supporting portion.

12. The bracket of claim 10, wherein the support surface is flat.

13. The bracket of claim 10, wherein each of the first and second arms comprise ratcheting teeth with first surfaces oriented at a first angle relative to the respective arms to provide for sliding movement when moving towards the closed position and with second surfaces oriented at a different second angle relative to the respective arms that prevent movement towards the open position.

14. The bracket of claim 10, wherein the mounting portion has a length measured between the first and second ends and a width measured perpendicular to the length, wherein the length is greater than the width.

15. The bracket of claim 10, wherein the socket comprises first and second ends that are spaced apart by a distance, a diameter of the cylinder is greater than the distance to prevent the cylinder from escaping from the socket.

16. The bracket of claim 10, further comprising an opening that extends through the supporting portion, the first arm of the lock comprises a lock face that faces towards the opening.

17. A method of retaining a cover on a lighting unit in a vehicle, the method comprising:

positioning a supporting portion of a bracket in an open position while a mounting portion of the bracket is secured to the vehicle with the supporting portion and the mounting portion being pivotally connected at a pivot;

pivoting the supporting portion relative to the mounting portion about the pivot in a first direction and moving a second end of the supporting portion towards the mounting portion;

contacting a support surface of the supporting portion against the cover and supporting the cover over the lighting unit; and locking the supporting portion while supporting the cover and preventing the supporting portion from pivoting in a second direction.

18. The method of claim 17, further comprising engaging ratcheting teeth on the mounting portion and the supporting portion and locking the supporting portion to the mounting portion.

19. The method of claim 17, further comprising laterally inserting a cylinder on one of the mounting portion and the supporting portion into a socket in the other of the mounting portion and the supporting portion and attaching the supporting portion to the mounting portion.

20. The method of claim 17, further comprising maintaining the supporting portion and the mounting portion together in both the open position and a closed position.

* * * * *